(12) United States Patent
Morikawa et al.

(10) Patent No.: US 12,549,018 B2
(45) Date of Patent: Feb. 10, 2026

(54) BATTERY SYSTEM

(71) Applicant: Vehicle Energy Japan Inc., Hitachinaka (JP)

(72) Inventors: Hiroshi Morikawa, Hitachinaka (JP); Kei Sakabe, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 530 days.

(21) Appl. No.: 17/439,222

(22) PCT Filed: Dec. 4, 2019

(86) PCT No.: PCT/JP2019/047427
§ 371 (c)(1),
(2) Date: Sep. 14, 2021

(87) PCT Pub. No.: WO2020/188901
PCT Pub. Date: Sep. 24, 2020

(65) Prior Publication Data
US 2022/0166227 A1    May 26, 2022

(30) Foreign Application Priority Data
Mar. 15, 2019 (JP) .................................. 2019-048375

(51) Int. Cl.
*H02J 7/00* (2006.01)
*B60L 58/18* (2019.01)
(Continued)

(52) U.S. Cl.
CPC ............ *H02J 7/0014* (2013.01); *B60L 58/18* (2019.02); *H01M 10/425* (2013.01);
(Continued)

(58) Field of Classification Search
CPC .................................................... H02J 7/0013
See application file for complete search history.

(56) References Cited

U.S. PATENT DOCUMENTS 5,796,175 A    8/1998 Itoh et al.
5,905,360 A    5/1999 Ukita
(Continued)

FOREIGN PATENT DOCUMENTS

CN    103085665 A    5/2013
DE    10020141 A1 * 10/2001 ................ H02J 1/08
(Continued)

OTHER PUBLICATIONS

International Search Report, PCT/JP2019/047427, Feb. 4, 2020, 2 pgs.
(Continued)

*Primary Examiner* — Tynese V McDaniel
(74) *Attorney, Agent, or Firm* — Volpe Koenig

(57) ABSTRACT

There is fear that some battery cells among battery cells which are serially connected may consume electric power all the time, thereby causing expansion of unbalance in voltage of the battery cells and hindering electric discharge of a battery system. When a second battery has a sufficient voltage, an electric current control board supplies operating power to a battery control unit and a relay via an external minus line and an external plus line. On the other hand, when the voltage of the second battery has decreased, the electric current control board supplies the operating power from a first battery to the battery control unit and the relay via an internal minus line and an internal plus line. A first electric current control unit and a second electric current control unit control the supply of the operating power according to, for example, the decrease in voltage of the second battery.

14 Claims, 2 Drawing Sheets

(51) Int. Cl.
  *H01M 10/42* (2006.01)
  *H01M 10/44* (2006.01)
  *H01M 10/48* (2006.01)
  *H01M 50/51* (2021.01)
  *H02J 7/34* (2006.01)

(52) U.S. Cl.
  CPC ......... *H01M 10/441* (2013.01); *H01M 10/48* (2013.01); *H01M 50/51* (2021.01); *H02J 7/0048* (2020.01); *H02J 7/00712* (2020.01); *H02J 7/342* (2020.01); *H01M 2010/4271* (2013.01)

(56) References Cited

U.S. PATENT DOCUMENTS

| | | | | |
|---|---|---|---|---|
| 6,422,331 | B1 * | 7/2002 | Ochiai | B60L 58/26 318/434 |
| 6,752,226 | B2 * | 6/2004 | Naito | B60L 15/20 318/140 |
| 8,704,488 | B2 * | 4/2014 | Yun | H02J 7/0048 320/124 |
| 8,917,039 | B2 * | 12/2014 | Yugo | B60L 58/20 318/34 |
| 2011/0101774 | A1 * | 5/2011 | Wagner | H02J 7/345 180/65.22 |
| 2011/0313613 | A1 * | 12/2011 | Kawahara | B60L 50/61 320/134 |
| 2013/0106320 | A1 | 5/2013 | Yugo | |
| 2014/0035531 | A1 * | 2/2014 | Garnier | B60L 58/18 320/118 |
| 2018/0217206 | A1 * | 8/2018 | Kiuchi | H02J 7/0025 |

FOREIGN PATENT DOCUMENTS

| | | |
|---|---|---|
| EP | 2587618 A | 5/2013 |
| JP | 2014-090608 A | 5/2014 |

OTHER PUBLICATIONS

Extended European Search Report issued on Nov. 7, 2022 for European Patent Application No. 19920196.3.

Chinese Office Action issued on Jun. 16, 2023 for Chinese Patent Application No. 201980094146.8.

* cited by examiner

BATTERY SYSTEM

TECHNICAL FIELD

The present invention relates to a battery system.

BACKGROUND ART

A battery system in which a plurality of battery cells are serially connected is used as an electric power source for hybrid automobiles, electric automobiles, and so on. On the other hand, a lead battery is used to supply a voltage of approximately 12 V to electrical equipment or the like.

PTL 1 discloses a technology that generates a feeding voltage from an output voltage of some battery cells among a plurality of battery cells which are serially connected.

CITATION LIST

Patent Literature

PTL 1: Japanese Patent Application Laid-Open (Kokai) Publication No. 2014-90608

SUMMARY OF THE INVENTION

Problems to be Solved by the Invention

With the technology disclosed in PTL 1, there is fear that some battery cells among the serially-connected battery cells may consume electric power all the times, thereby causing expansion of unbalance in the voltage of the battery cells and hindering electric discharge of the battery system.

Means to Solve the Problems

The battery system according to the present invention includes: a first battery in which a plurality of battery cells are serially connected; a battery control unit that is configured to control the first battery and to which electric power is configured to be supplied from a second battery of a lower voltage than that of the first battery; and a first electric current control unit that is configured to be provided in a current path, to which some battery cells among the plurality of battery cells constituting the first battery and the second battery are electrically connected, and that is configured to control an electric current flowing from the said some battery cells to the current path.

Advantageous Effects of the Invention

According to the present invention, the expansion of unbalance in the voltage of the battery cells can be prevented and the battery system can be operated stably.

DESCRIPTION OF EMBODIMENTS

Figure 1:
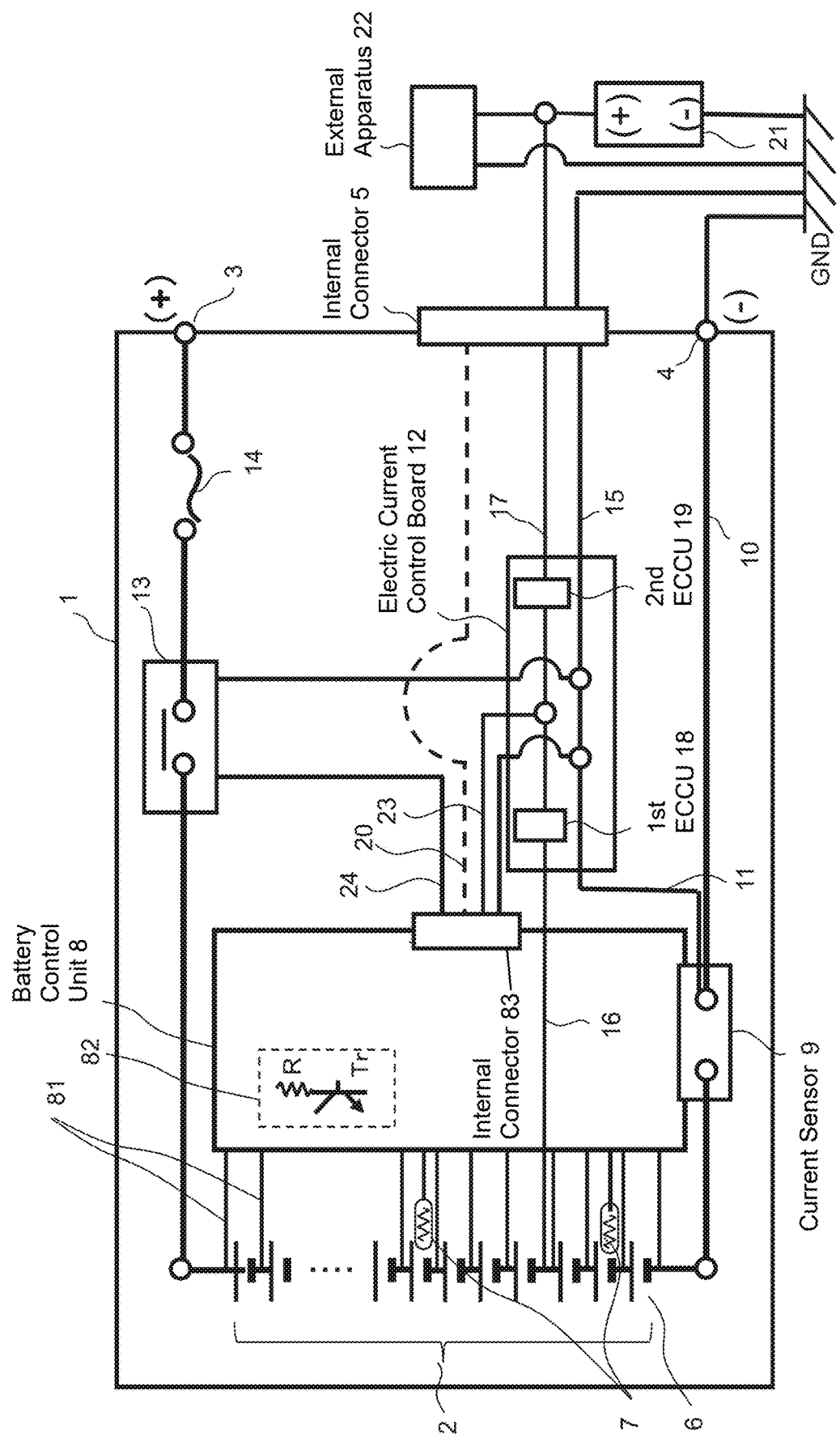
FIG. 1 is a configuration diagram of a battery system.

FIG. 1 is a configuration diagram of a battery system 1 according to this embodiment. The battery system 1 is a battery module which has a first battery 2 built-in. The battery system 1 includes a plus terminal 3, a minus terminal 4, and an external connector 5.

A positive electrode of a second battery 21 is connected to the external connector 5 and a negative electrode of the second battery 21 is further connected to the external connector 5 via body earth. The second battery 21 supplies electric power to an external apparatus 22 such as electrical equipment and supplies the electric power which becomes an operating voltage of a battery control unit 8 and a relay 13 inside the battery system 1.

The battery system 1 has the first battery 2 built-in. The first battery 2 is configured such that a plurality of battery cells 6 are serially connected.

A thermistor 7 is provided in the vicinity of the first battery 2 and its signal line is input to the battery control unit 8. Moreover, a voltage detection line 81 for measuring a voltage of each battery cell 6 is input from each battery cell 6 to the battery control unit 8.

The battery control unit 8 is in charge of, for example, voltage monitoring, electric current monitoring, and relay action control of the first battery 2. Accordingly, the battery control unit 8 includes a microcomputer, a circuit pattern, and measurement components which are required in order to perform various kinds of monitoring and actions and whose illustrations are omitted.

Furthermore, a balancing circuit 82 for equally adjusting voltage values of the respective battery cells 6 of the first battery 2 is provided inside the battery control unit 8. FIG. 1 illustrates one balancing circuit 82, but a plurality of balancing circuits 82 are provided corresponding to the plurality of battery cells 6, respectively. The balancing circuit 82 is configured by serially connecting a resistor R and a switching element Tr; and the battery control unit 8 adjusts the voltage of the battery cell 6 by setting on the switching element Tr corresponding to the battery cell 6, whose voltage value should be adjusted, for a specified period of time.

A negative electrode of a battery cell 6 with the lowest electric potential in the first battery 2 is connected to the minus terminal 4 via a current sensor 9 and a power-current-side line 10. Moreover, the negative electrode of the battery cell 6 with the lowest electric potential in the first battery 2 is connected to an electric current control board 12 via the current sensor 9 and an internal minus line 11. On the other hand, a positive electrode of a battery cell 6 with the highest electric potential in the first battery 2 is connected to the plus terminal 3 via the relay 13 and a fuse 14.

The internal minus line 11 which branches out from a minus-side potential portion of the first battery is connected to an external minus line 15, which is linked to a minus side of the second battery 21, on a minus side of the electric current control board 12. Consequently, an electric potential of the minus terminal 4 needs to be an electric potential close to the external minus line 15 which is linked to the second battery 21. The second battery 21 is, for example, a 12-V lead battery for mild hybrid vehicles; and a negative electrode of the second battery 21 is linked to body earth. Therefore, there is no large electric potential difference between the internal minus line 11 and the external minus line 15. Incidentally, the internal minus line 11 does not have to be provided as long as there is a path from the power-current-side line 10 to the external minus line 15 through the minus terminal 4, the body earth, and the external connector 5.

Regarding a plus side of the electric current control board 12, a first electric current control unit 18 is connected to an internal plus line 16 which is linked with some battery cells 6 of the first battery 2 interposed between them. Some battery cells include a battery cell 6 which has the lowest electric potential and is connected to the ground; and the number of the battery cells is selected so that their voltage becomes lower than the voltage of the second battery 21. Incidentally, the internal plus line 16 may share a part of the voltage detection line 81. Furthermore, a second electric current control unit 19 is provided in a current path linked to the internal plus line 16 on the electric current control board 12; and the first electric current control unit 18 and the second electric current control unit 19 are connected. The second electric current control unit 19 is linked to the plus side of the second battery 21 via an external plus line 17. An operating power supply line 23 to the battery control unit 8 is connected to a connecting point between the first electric current control unit 18 and the second electric current control unit 19. One of the operating power to the relay 13 is supplied from the battery control unit 8 by way of a relay operating power line 24. The battery control unit 8 switches on and off the relay 13 by changing the supply of the electric power to the relay 13 via the relay operating power line 24.

When the second battery 21 has a sufficient voltage, the electric current control board 12 supplies the operating power to the battery control unit 8 and the relay 13 via the external minus line 15 and the external plus line 17. In this case, the electric current flowing from some battery cells of the first battery 2 is limited, so that it is possible to prevent the expansion of unbalance in the voltage of some battery cells in the first battery 2. On the other hand, when the voltage of the second battery 21 has decreased, the electric current control board 12 supplies the operating power from the first battery 2 to the battery control unit 8 and the relay 13 via the internal minus line 11 and the internal plus line 16. In other words, actions of the battery control unit 8 and the relay 13 can be secured even if the voltage of the second battery 21 decreases.

The first electric current control unit 18 and the second electric current control unit 19 control the supply of the operating power according to the decrease of the voltage of the second battery 21. When the electric power supplied from the second battery 21 to the battery control unit 8 and the relay 13 has decreased, the first electric current control unit 18 supplies the electric power, which is supplied from some battery cells 6 of the first battery 2, to the battery control unit 8 and the relay 13. On the other hand, when the electric power supplied from the second battery 21 to the battery control unit 8 and the relay 13 has not decreased, the supply of the electric power, which is supplied from some battery cells 6 of the first battery 2, to the battery control unit 8 and the relay 13 is limited. When the electric power supplied from the second battery 21 to the battery control unit 8 and the relay 13 has decreased, the second electric current control unit 19 limits the supply of the electric power, which is supplied from some battery cells 6 of the first battery 2, to the second battery 21 side.

Incidentally, since the electric power is supplied by some battery cells 6 of the first battery 2 as appropriate, unbalance occurs in the voltage of the battery cells 6 of the first battery 2. Therefore, the balancing circuit 82 in the battery control unit 8 adjusts the voltage of the battery cells 6 of the first battery 2.

A control signal line 20 is linked to the battery control unit 8 via an internal connector 83 in order to communicate with an external system, so that the battery control unit 8 conducts monitoring and control of the first battery 2.

In this embodiment, as one example, a lithium battery with the maximum voltage of 4.3 V and the minimum voltage of 2 V is used as a battery cell 6 of the first battery 2 by applying an average voltage of 3.6 V, a full-charge voltage of 4.2 V, and short-time operating voltage including an over-voltage including the conduction of the electric current upon discharging and charging. Moreover, the SOC is set as 20% to 80% as the SOC range to normally use the battery cells 6 and the corresponding open-circuit voltage is within the range from 3.5 V to 3.9 V. If the voltage of the first battery 2 exceeds the operating voltage of the battery control unit 8 as a stable circuit voltage without conduction of the electric current, there is no limitation on the number of the serially-connected battery cells 6; however, it is set as 12 cells in this embodiment. The operating voltage range of the battery control unit 8 is set as 6 V or more.

A total voltage of the battery cells 6 placed between the internal plus line 16 and an electric potential unit on the minus side is set within the range not exceeding the voltage of the second battery 21 in normal condition. This is in order to receive the supply of the electric power from the second battery 21 when the voltage of the second battery 21 is normal. In this embodiment, the battery cell 6 is set to have an average voltage of 3.6 V and the second battery 21 is set as 12 V by assuming a lead battery, so that an appropriate battery cell count of the battery cells 6 becomes three cells or less. On the other hand, the operating range of the battery control unit 8 is set as 6 V or more, so that two or more cells of the battery cells 6 are required because of the relation between an open-circuit voltage lower limit 3.5 V/cell of the operating range to be used normally and 6 V. Consequently, either two cells or three cells are selected as the battery cells 6.

Regarding the cell count to be selected, consideration is paid to the case where the battery cells 6 side is charged from the second battery 21 due to a failure of, for example, the circuit in the battery system 1. In this case, the cell count should preferably be configured so that any events of deformation of the battery cells 6 or leakage of an electrolytic solution would not occur even if the battery cells 6 are overcharged to a voltage obtained by dividing a power supply voltage of the second battery 21 by the cell count. In this embodiment, three cells are selected by considering 1.2 times as large as, or less than, the full-charge voltage of the battery cell 6 as a guideline. The maximum voltage upon charging is 4.3 V, so that if the three cells are selected, the voltage will become 12.9 V and exceeds the voltage of the second battery 21. However, this would not cause any problem because: it is only limited to the case where a large charging electric current flows; and the voltage of the second battery 21 also becomes higher than 12 V due to over-voltage for charging when the vehicle is running.

The cell count n to be selected as some battery cells is selected to satisfy the relation of the following formula (1) where V1 represents a voltage of the first battery 2 when the SOC is 100%, and V2 represents a voltage which is input from the second battery.

$$V2 \leq V1 \times 1.2n \tag{1}$$

Figure 2A:
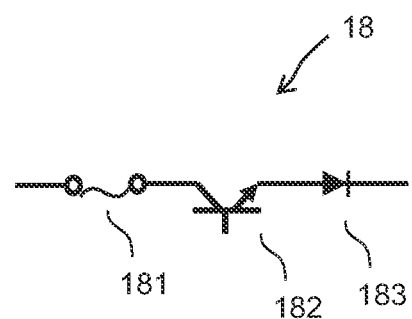
FIG. 2A is a circuit configuration diagram of a first electric current control unit.
Figure 2B:
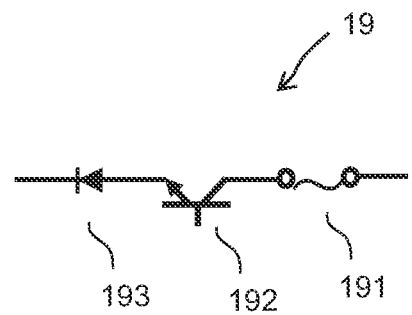
FIG. 2B is a circuit configuration diagram of a second electric current control unit.

FIG. 2A is one example of a circuit configuration diagram of the first electric current control unit 18 and FIG. 2B is one example of a circuit configuration diagram of the second electric current control unit 19.

The first electric current control unit 18 is configured, as illustrated in FIG. 2A, by serially connecting a fuse 181, a switching element 182, and a diode 183. When the voltage of the second battery 21 has decreased, the first electric current control unit 18 supplies the operating power from the first battery 2 to the battery control unit 8 and the relay 13. Moreover, the first electric current control unit 18 defines the direction of the electric current for the purpose of charging a portion of the first battery 2 from the second battery 21. The switching element 182 controls on/off in accordance with a command from the battery control unit 8 and disconnects the internal plus line 16 when unnecessary. The fuse 181 protects the system when an excess current flows. The fuse 181 and the switching element 182 are not indispensable components.

The second electric current control unit 19 is configured, as illustrated in FIG. 2B, by serially connecting a fuse 191, a switching element 192, and a diode 193. The second electric current control unit 19 itself is not an indispensable component; however, it limits the supply of the electric current from a part of the first battery 2 to the second battery 21 and to the outside of the battery system 1 by, for example, placing the diode 193 in the second electric current control unit 19. Then, it prevents an excess electric current from flowing into the internal plus line 16 and the external plus line 17.

Furthermore, if only the switching element 192 is provided in the second electric current control unit 19 and the voltage of the second battery 21 decreases by normal use, the voltage can be also supplied from the first battery 2 by, for example, setting on the switching element 192 only when limited to cranking or the like at a low temperature. Moreover, if the voltage of the second battery 21 continues to be low, the actions of the battery control unit 8 are ensured by suppressing the electric discharge of the first battery 2 by setting off the switching element 192. Moreover, the switching element 192 can not only reduce dark current consumption, but also protect the first battery 2 from, for example, a short circuit of the external plus line 17.

If the diode 193 or the like for preventing the electric current from flowing from the first battery 2 is not placed in the second electric current control unit 19, the electric power can be supplied from the first battery 2 to, for example, the external apparatus 22 outside the battery system 1 when the voltage of the second battery 21 decreases. In this case, upon a failure of the power supply source for the second battery 21, the battery system 1 can supplement its functions. However, since a large electric current flows into the internal plus line 16 and the external plus line 17, it is necessary to design each line to have large current-carrying capacity. Furthermore, it is necessary to perform designing and control appropriately by placing the switching element 182, a resistor, and so on according to an electric current volume to be supplied outside from the battery system 1 and current conduction time. Furthermore, since the voltage unbalance occurs within the first battery 2, it is necessary to cause the balancing circuit 82 in the battery control unit 8 to enhance the voltage adjustment by, for example, increasing an electric current value, increasing frequency of the voltage adjustment, or increasing electric discharge time.

The first electric current control unit 18 and the second electric current control unit 19 are placed on the electric current control board 12; however, they may be placed at arbitrary positions on the internal plus line 16 or the external plus line 17. Moreover, the first electric current control unit 18 and the second electric current control unit 19 may be placed in a part of a circuit board equipped with the battery control unit 8 or in a part of other circuit boards; and in this case, downsizing of the battery system 1 can be implemented.

The following operational advantage is obtained according to the above-explained embodiment.

(1) The battery system 1 includes: the first battery 2 in which the plurality of battery cells 6 are serially connected; the battery control unit 8 that controls the first battery 2 and to which the electric power is supplied from the second battery 21 with a lower voltage than that of the first battery 2; and the first electric current control unit 18 that is provided in a current path (the internal plus line 16 and the external plus line 17), which electrically connects some battery cells 6 among the plurality of battery cells 6 constituting the first battery 2, and the second battery 21, and controls the electric current flowing from some battery cells 6 to the current path (the internal plus line 16 and the external plus line 17). Consequently, the expansion of unbalance in the voltage of the battery cells can be prevented and the battery system can be operated stably.

The present invention is not limited to the aforementioned embodiment; and unless the features of the present invention are impaired, other aspects which can be thought of within the scope of the technical idea of the present invention are also included within the scope of the present invention.

REFERENCE SIGNS LIST

1: battery system
2: first battery
3: plus terminal
4: minus terminal
5: external connector
6: battery cells
7: thermistor
8: battery control unit
9: current sensor
10: power-current-side line
11: internal minus line
12: electric current control board
13: relay
14: fuse
15: external minus line
16: internal plus line
17: external plus line
18: first electric current control unit
19: second electric current control unit
20: control signal line
21: second battery
22: external apparatus
23: operating power supply line
24: relay operating power line
81: voltage detection line
82: balancing circuit
83: internal connector

The invention claimed is:

1. A battery system comprising:
a first battery in which a plurality of battery cells are serially connected, the plurality of battery cells constituting the first battery;
a second battery of a lower voltage than that of the first battery;
a battery control unit that is configured to perform voltage monitoring, electric current measurement of a current drawn by the battery control unit, and relay action control of the first battery and to which electric power is configured to be supplied from the second battery, the battery control unit including a microcomputer and a circuit pattern;

a balancing circuit disposed within the battery control unit and configured to adjust a charged state of each of the plurality of battery cells of the first battery;

a plurality of voltage detection lines each respectively connected from a respective battery cell of the plurality of battery cells to the battery control unit, the battery control unit configured to monitor and control the first battery based upon the plurality of voltage detection lines;

an electric current control board comprising a printed circuit board disposed electrically between the battery control unit and the second battery, the electric current control board operatively coupled to the first battery and the second battery and configured to supply the electric power via a current path to the battery control unit, the electric current control board comprising:

a first electric current control unit that is configured to be provided in the current path, to which a subset of battery cells among the plurality of battery cells constituting the first battery including a battery cell of lowest electric potential connected to ground are electrically connected, and that is configured to control an electric current flowing from the subset of battery cells to the current path; and a second electric current control unit that is provided in the current path and that is configured to control an electric current flowing from the second battery through the current path;

wherein the first electric current control unit and the second electric current control unit are connected and provided on the electric current control board;

wherein, when a voltage of the second battery decreases below a prescribed threshold, the microcomputer opens the second electric current control unit and closes the first electric current control unit so that the battery control unit is powered via the current path solely from the subset of battery cells, and continues cell-by-cell monitoring via the plurality of voltage detection lines while powered from the subset of battery cells; and wherein the balancing circuit adjusts the charged state of each of the plurality of battery cells of the first battery, under a condition that the battery control unit is powered from the subset of battery cells, by increasing an electric current value, and increasing a frequency of a voltage adjustment to limit cell-to-cell voltage deviation during the condition.

2. The battery system according to claim 1,
wherein the first electric current control unit is configured to:
supply electric power from the subset of battery cells of the first battery to the battery control unit when the electric power supplied from the second battery to the battery control unit decreases below the prescribed threshold; and
control the electric power supplied from the subset of battery cells of the first battery to the battery control unit when the electric power supplied from the second battery to the battery control unit has not decreased,
wherein the prescribed threshold is greater than a rest-state open-circuit voltage of any single battery cell.

3. The battery system according to claim 1, wherein the second electric current control unit is configured to control supply of the electric power from the subset of battery cells of the first battery to a second battery side when the electric power supplied from the second battery to the battery control unit has decreased.

4. The battery system according to claim 1,
wherein the first electric current control unit includes a diode.

5. The battery system according to claim 4,
wherein the first electric current control unit includes a switching element serially connected to the diode.

6. The battery system according to claim 5,
wherein the first electric current control unit includes a fuse serially connected to the diode and the switching element.

7. The battery system according to claim 1,
wherein the second electric current control unit includes a diode.

8. The battery system according to claim 7,
wherein the second electric current control unit includes a switching element serially connected to the diode.

9. The battery system according to claim 8,
wherein the second electric current control unit includes a fuse serially connected to the diode and the switching element.

10. The battery system according to claim 1,
wherein the subset of battery cells are selected to include a battery cell which has the lowest electric potential and is connected to ground.

11. The battery system according to claim 1, wherein regarding the said some battery cells, the number of battery cells is selected so that their voltage becomes lower than a voltage of the second battery in normal condition.

12. The battery system according to claim 1,
wherein a cell count n of the subset of battery cells is configured to be selected so that a relation of $V2<V1\times 1.2n$ is satisfied where V1 represents a voltage of the first battery at SOC=100% and V2 represents a voltage which is input from the second battery.

13. The battery system according to claim 1, further comprising:
a voltage detection line configured for measuring a voltage of each of the plurality of battery cells,
the battery control unit further configured to control the first battery based upon at least a voltage measurement of each of the plurality of battery cells.

14. The battery system according to claim 1, wherein when a voltage of the second battery has decreased, the first battery maintains power to the battery control unit to continue the monitoring and controlling by the battery control unit of the first battery based upon the plurality of voltage detection lines to continue electric discharge of the first battery for a stable operation of the battery system.

* * * * *